United States Patent
Finzetto et al.

(10) Patent No.: US 11,125,027 B2
(45) Date of Patent: Sep. 21, 2021

(54) FLAT PACK HAVING SPACER BETWEEN TUBES

(71) Applicant: SANDVIK MATERIALS TECHNOLOGY LLC, Clarks Summit, PA (US)

(72) Inventors: Leandro Finzetto, Katy, TX (US); Andre Hundzinski, Rio de Janeiro (BR)

(73) Assignee: Sandvik Materials Technology LLC, Clarks Summit, PA (US)

( * ) Notice: Subject to any disclaimer, the term of this patent is extended or adjusted under 35 U.S.C. 154(b) by 142 days.

(21) Appl. No.: 16/481,864

(22) PCT Filed: Jan. 30, 2018

(86) PCT No.: PCT/US2018/015892
§ 371 (c)(1),
(2) Date: Jul. 30, 2019

(87) PCT Pub. No.: WO2018/144432
PCT Pub. Date: Aug. 9, 2018

(65) Prior Publication Data
US 2019/0376349 A1    Dec. 12, 2019

Related U.S. Application Data

(60) Provisional application No. 62/452,410, filed on Jan. 31, 2017.

(51) Int. Cl.
*F16L 55/00*     (2006.01)
*E21B 17/20*     (2006.01)
(Continued)

(52) U.S. Cl.
CPC .......... *E21B 17/206* (2013.01); *E21B 17/003* (2013.01); *F16L 11/22* (2013.01)

(58) Field of Classification Search
CPC ....... F16L 11/22; E21B 17/206; E21B 17/003
(Continued)

(56) References Cited

U.S. PATENT DOCUMENTS 3,992,565 A * 11/1976 Gatfield ................ F16L 11/121
174/15.7
RE30,373 E * 8/1980 Nist, Jr. ................ B65D 61/00
100/2
(Continued)

FOREIGN PATENT DOCUMENTS

WO     2010/044833 A1    4/2010

OTHER PUBLICATIONS

International Search Report and Written Opinion dated Apr. 10, 2018, issued in corresponding International Patent Application No. PCT/US2018/015892.

*Primary Examiner* — James F Hook
(74) *Attorney, Agent, or Firm* — Morgan, Lewis & Bockius LLP

(57) ABSTRACT

A flat pack (1) for operating a downhole tool or sensor includes a plurality of tubes (3a, 3b); a spacer (2) disposed between the tubes (3a, 3b); and a jacket (4) encapsulating the tubes (3a, 3b) and the spacer (2). The tubes (3a, 3b) and the spacer (2) are positioned in the jacket (4) in a side-by-side arrangement. The tubes (3a, 3b) and the spacer (2) are not twisted along the flat pack (1).

30 Claims, 3 Drawing Sheets

(51) Int. Cl.
*E21B 17/00* (2006.01)
*F16L 11/22* (2006.01)

(58) Field of Classification Search
USPC .................. 138/104, 108, 112, 116, 117
See application file for complete search history.

(56) References Cited

U.S. PATENT DOCUMENTS

| | | | |
|---|---|---|---|
| 4,374,530 A * | 2/1983 | Walling .................. | E21B 17/20 |
| | | | 137/355.26 |
| 4,399,319 A * | 8/1983 | Zinn ....................... | F16L 11/22 |
| | | | 174/47 |
| 4,611,656 A * | 9/1986 | Kendall, Jr. ......... | E21B 17/1035 |
| | | | 138/107 |
| 6,052,502 A | 4/2000 | Coleman | |
| 7,581,565 B1 | 9/2009 | Torrance et al. | |
| 7,954,518 B2 | 6/2011 | Torrance et al. | |
| 8,304,651 B2 | 11/2012 | Figenschou et al. | |
| 8,499,800 B1 * | 8/2013 | Pellegrini ............... | F16L 57/06 |
| | | | 138/140 |
| 2001/0050111 A1 | 12/2001 | Neuroth et al. | |
| 2006/0201565 A1 * | 9/2006 | Coupe .................... | F16L 1/028 |
| | | | 138/106 |
| 2013/0146171 A1 | 6/2013 | Quigley et al. | |
| 2014/0124232 A1 * | 5/2014 | Sarchi .................... | F24S 80/30 |
| | | | 174/27 |

\* cited by examiner

FLAT PACK HAVING SPACER BETWEEN TUBES

BACKGROUND OF THE DISCLOSURE

Field of the Disclosure

The present disclosure relates to a flat pack having a spacer between tubes.

Description of the Related Art

U.S. Pat. No. 7,581,565 discloses installing a tear cord between a metal tube and a protective jacket. The jacketed tubes may be used in a hydrocarbon production downhole well bore. The tubes may be used to furnish hydraulic fluid or chemicals into the well bore. The contents may be pressurized or under vacuum. The jacketed tubes are hermetically sealed. The tubes, which may be 1 inch in diameter, are joined using compression fittings. Tear cords are used to facilitate removal of the protective jacket without damage to the tube surface thereby facilitating the placement of compression fittings and maintaining the integrity of the tube wall.

U.S. Pat. No. 7,954,518 discloses installing a plurality of tear cords between a metal tube and a protective jacket. The multiple cords facilitate ease of removal of the protective jacket by creating a panel of the jacket that is detached from the remainder by pulling on the multiple tear cords. The resulting widened space can be used to remove the tube from the remaining protective jacket. The jacketed tubes may be used in a hydrocarbon production downhole well bore. The tubes may be used to furnish hydraulic fluid or chemicals into the well bore. The contents may be pressurized or under vacuum. The jacketed tubes are hermetically sealed. The tubes, which may be 1 inch in diameter, are joined using compression fittings. Tear cords are used to facilitate removal of the protective jacket without damage to the tube surface thereby facilitating the placement of compression fittings and maintaining the integrity of the tube wall.

U.S. Pat. No. 8,304,651 discloses an umbilical including a number of fluid pipes, electric wires and/or optical conductors, filler material located at least partially around and between the fluid pipes and the wires/conductors, and they are collectively gathered in a twisted bundle by a laying operation. The umbilical further includes a protective jacket that encompasses the fluid pipes, the wires/conductors and the filler material, and at least one load carrying element located in the cross section of the umbilical. Optionally, one or more fluid pipes constitute load carrying elements. The fluid pipes, the wires/conductors, the filler material and the at least one load carrying element, are alternately laid, i.e. by continuously alternating direction, in the entire or part of the longitudinal extension of the umbilical.

SUMMARY

The present disclosure relates to a flat pack having a spacer between tubes. In one embodiment, a flat pack for operating a downhole tool or sensor includes a plurality of tubes; a spacer disposed between the tubes; and a jacket encapsulating the tubes and the spacer. The tubes and the spacer are positioned in the jacket in a side-by-side arrangement. The tubes and the spacer are not twisted along the flat pack.

In another embodiment, a line for operating a downhole tool or sensor includes a tube; a tear cord; a spacer having a top, a bottom, a concave side receiving a portion of an outer surface of the tube, and a flat side having a guide receiving the tear cord; and a jacket encapsulating the tube, the spacer, and the tear cord. The tube and the spacer are not twisted along the line.

In another embodiment, a flat pack for operating a downhole tool or sensor includes: a tube; a pair of bumpers; a pair of spacers disposed between the tube and the bumpers; and a jacket encapsulating the tube, the bumpers, and the spacers. The tube, the spacers, and the bumpers are positioned in the jacket in a side-by-side arrangement. The tube and the spacers are not twisted along the flat pack.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1A:
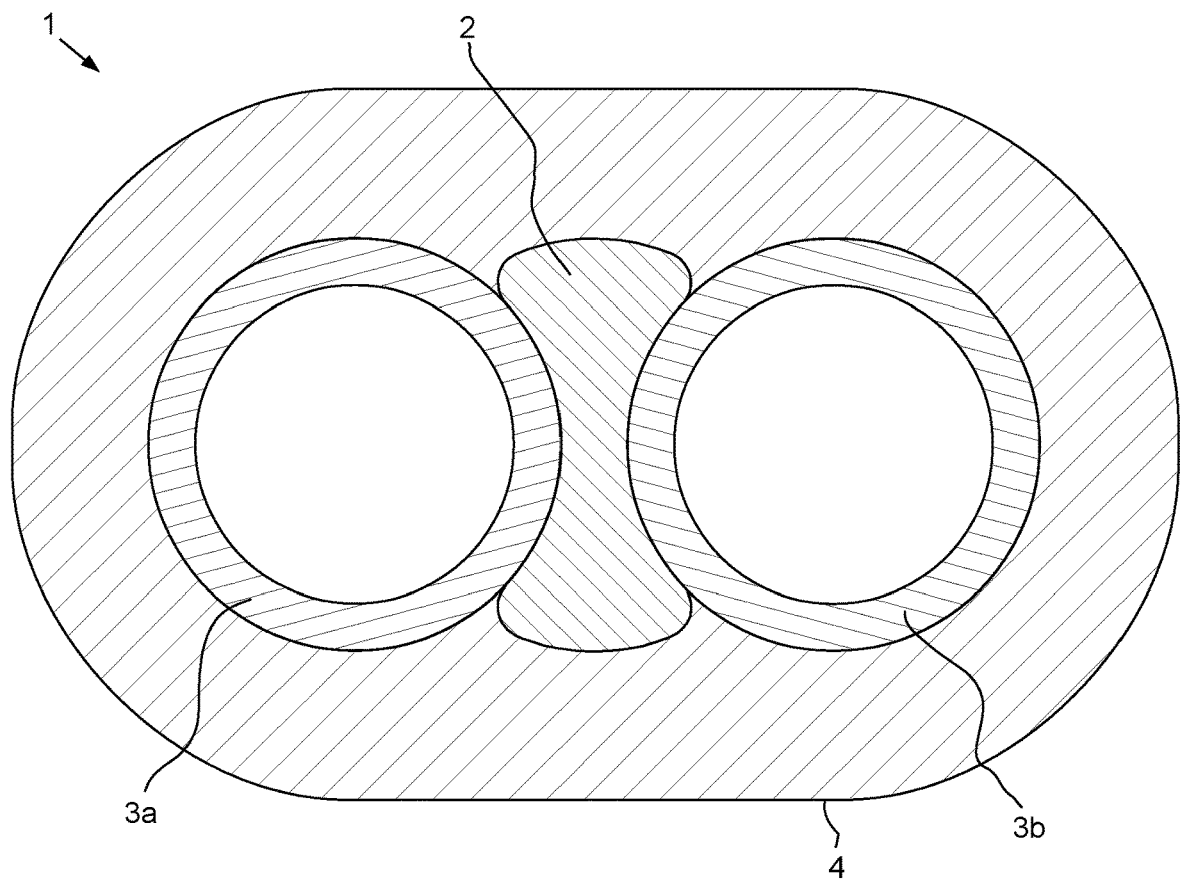
FIGS. 1A and 1B illustrate a first flat pack having a spacer between flowlines, according to one embodiment of the present disclosure.
Figure 1B:
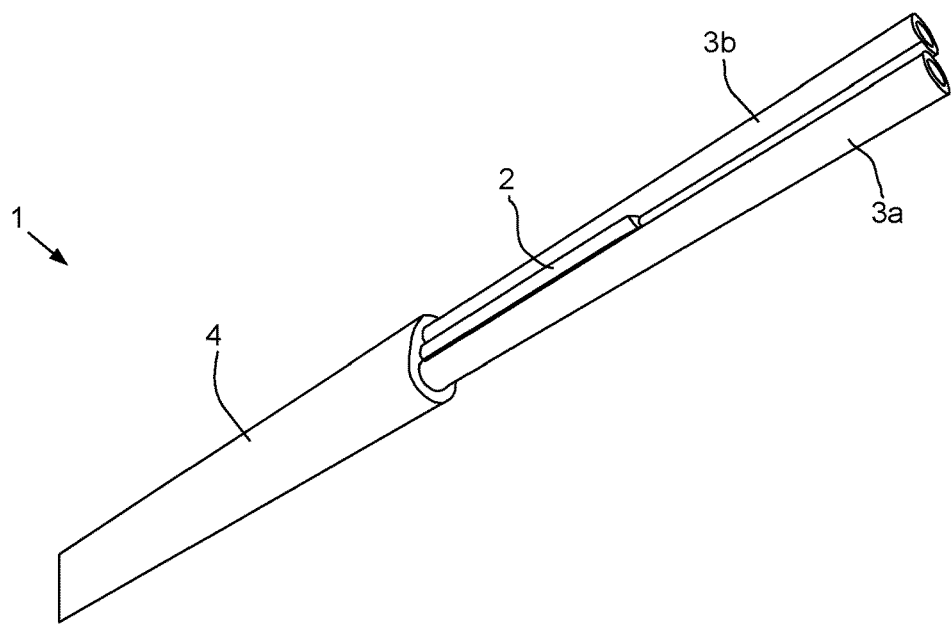

FIGS. 1A and 1B illustrate a first flat pack 1 having a spacer 2 between flowlines, according to one embodiment of the present disclosure. The flat pack 1 may include the spacer 2, a plurality of tubes 3a,b, and a protective jacket 4. The tubes 3a,b may each be flowlines for transporting hydraulic fluid (not shown) to a downhole tool (not shown), such as a surface controlled subsurface safety valve (SCSSV), flow control valve, and/or sliding sleeve valve, assembled as part of a production tubing string (not shown) disposed in a wellbore (not shown). The production tubing string may transport hydrocarbons (not shown), such as crude oil and/or natural gas from the wellbore to a production tree (not shown). The flat pack 1 may extend to the downhole tool along an outer surface of the production tubing and be secured thereto at regular intervals. The flowlines may also be used for transporting chemicals to the downhole tool, such as an injection valve, assembled as part of the production tubing string. A length of the flat pack 1 may be greater than or equal to one hundred meters, five hundred meters, or one kilometer.

Each tube 3a,b may be made from a metal or alloy, such as galvanized or plain carbon steel, stainless steel, or nickel-chromium-iron alloy. Each tube 3a,b may be sized to have an outer diameter ranging between one-eighth inch (three point one seven five millimeters) and one and a half inches (thirty-eight millimeters) and have a wall thickness ranging between one-hundredth inch (one-quarter millimeter) and one-tenth inch (two and a half millimeters).

Alternatively, the tubes 3a,b may be part of TECs and/or TEFs instead of serving as flowlines.

The spacer 2 may be made from a thermoset polymer, such as cross-linked polyethylene (PEX, aka XLPE). The PEX material may be sufficiently flexible so that the flat pack 1 may be spooled for transport and storage. The spacer 2 may have a slightly curved top and bottom and concave sides for receiving portions of outer surfaces of the tubes 3a,b therein, thereby having a cross-section resembling an hourglass shape. A curvature of the concave sides may match a curvature of the tubes 3a,b so that the tube portions fit snugly therein. The portions of the tubes 3a,b received by the spacer 2 may range between one-quarter and one-half of each outer surface thereof. A height of the spacer 2 may match the outer diameter of the tubes 3a,b. A minimum width of the spacer 2 may range between one and five millimeters.

The jacket 4 may encapsulate the tubes 3a,b and the spacer 2. A cross-section of the jacket 4 may have a rounded rectangular shape. The tubes 3a,b and the spacer 2 may be positioned in the jacket 4 in a side-by-side arrangement and the spacer may be disposed between the tubes. The jacket 4 may be made from a thermoplastic polymer or thermoplastic copolymer, such as polypropylene, polyamide, or fluoropolymer (PVDF, ETFE, FEP, or ECTFE), or a thermoplastic elastomer, such as thermoplastic polyester elastomer or thermoplastic vulcanizate.

The jacket 4 may be applied to the tubes 3a,b and the spacer 2 by extrusion. The spacer 2 may be prefabricated in a separate extrusion process and cross-linked either during the extrusion process or thereafter. Before spooling, the tubes 3a,b and the spacer 2 may be longitudinally straight. Even after spooling, the tubes 3a,b and the spacer 2 may still not twist as they extend along the flat pack 1. Before installation, the tubes 3a,b, spacer 2, and jacket 4 may each extend a length of the flat pack 1. During installation, the spacer 2 and jacket 4 may be stripped from the flat pack 1 at each end thereof.

Advantageously, industry specifications dictate a minimum spacing of at least one millimeter between adjacent members (flowlines, TECs, or TEFs) thereof in the flat pack to guarantee safe operation of the flat pack in the wellbore. For prior art flat packs having the jacket extending between the members, it is difficult to ensure that the minimum spacing exists throughout the entire length of the flat pack. Use of the prefabricated spacer 2 guarantees that the minimum spacing is maintained throughout the entire length of the flat pack 1.

Figure 2A:
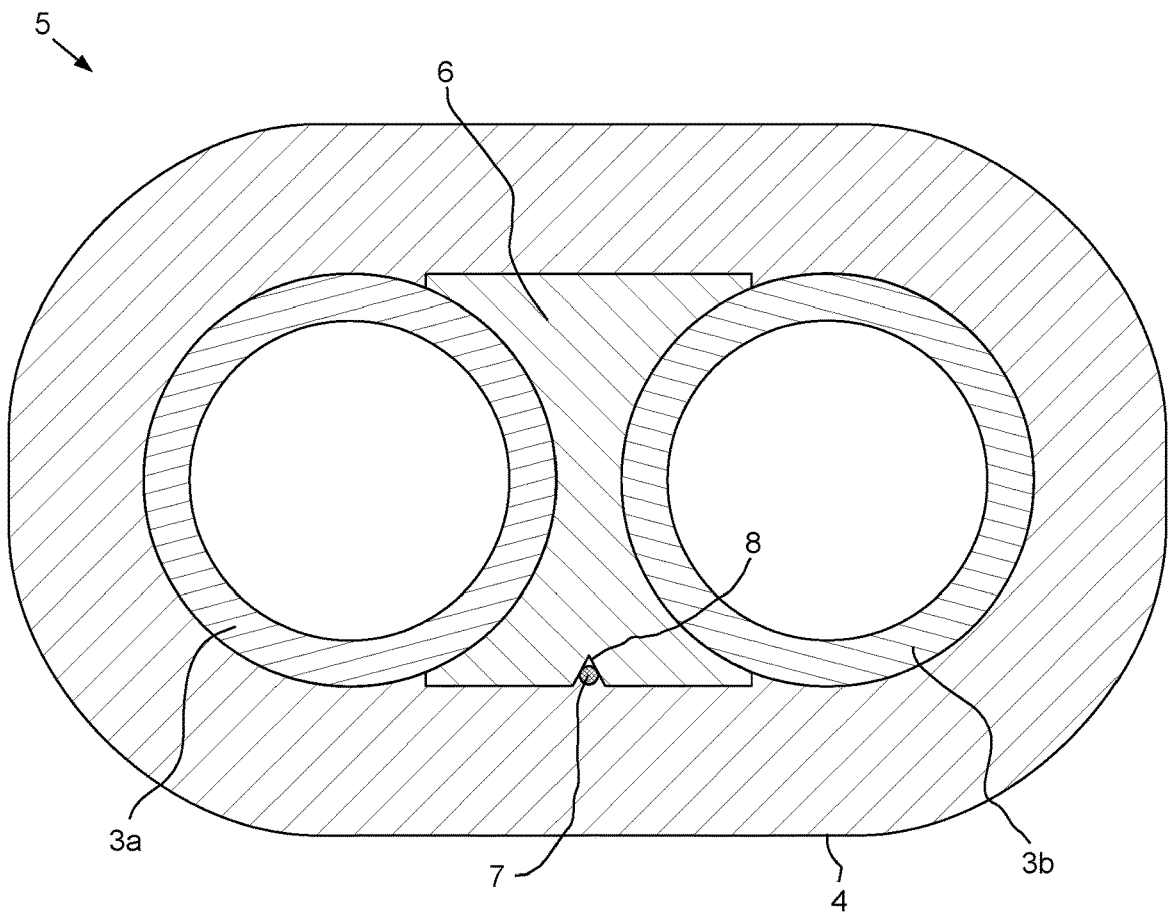
FIGS. 2A and 2B illustrate a second flat pack having a spacer equipped with a tear cord, according to another embodiment of the present disclosure.
Figure 2B:
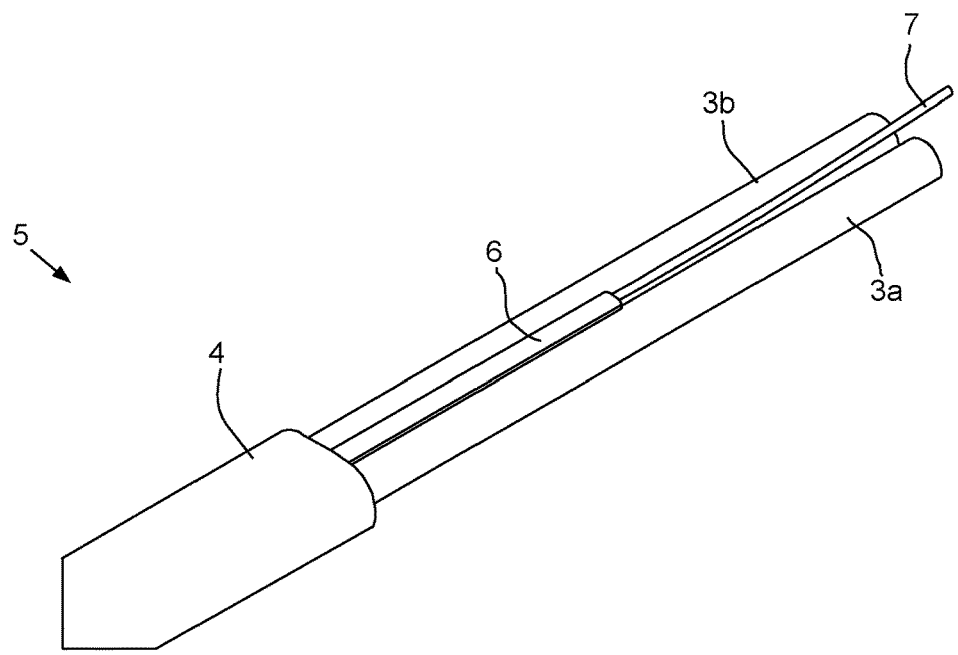

FIGS. 2A and 2B illustrate a second flat pack 5 having a spacer 6 equipped with a tear cord 7, according to another embodiment of the present disclosure. The second flat pack 5 may include the spacer 6, the tubes 3a,b, the protective jacket 4, and the tear cord 7. The spacer 6 of the second flat pack 5 may be similar to the spacer 2 of the first flat pack 1 except for having a flat top and a flat bottom instead of the slightly curved top and bottom and except for including a guide 8. The guide 8 may receive the tear cord 7 therein and the jacket 4 may encapsulate the tear cord 7 in addition to the spacer 6 and the tubes 3a,b. The guide 8 may be a notch formed in the flat bottom (shown) or top (not shown) of the spacer 6 and the guide and tear cord 7 may extend the entire length of the second flat pack 5 (prior to installation). The guide 8 may be centrally located along the top or bottom of the spacer 6. The tear cord 7 may or may not protrude from ends of the jacket 4. The tear cord 7 may be made from metal or alloy, such as steel wire, or a polymer fiber, such as poly-aramid or polyamide.

Advantageously, addition of the tear cord 7 may facilitate stripping of the jacket 4 and the spacer 6 from ends of the second flat pack 5 during installation. This allows the jacket 4 to be split by a technician pulling on the tear cord 7 instead of having to use an open blade to cut the jacket, thereby improving safety and eliminating risk of damage to the tubes 3a,b.

Alternatively, the second flat pack 5 may have a second tear cord disposed in a second guide formed in the top of the spacer 6. Alternatively, the tubes 3a,b may be part of TECs and/or TEFs instead of serving as flowlines.

Figure 3A:
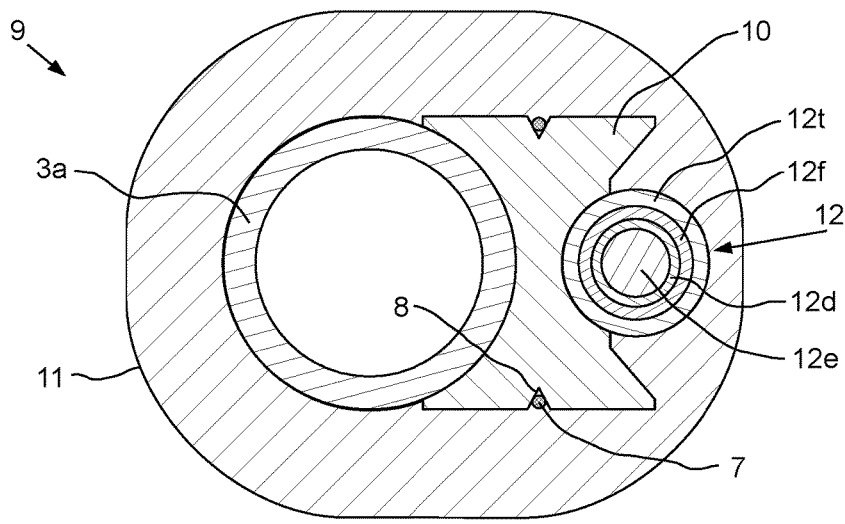
FIG. 3A illustrates a third flat pack having a tear cord equipped spacer between a flowline and a tubing encased conductor (TEC), according to another embodiment of the present disclosure.

FIG. 3A illustrates a third flat pack 9 having a tear cord 7 equipped spacer 10 between a flowline and a tubing encased conductor (TEC) 12, according to another embodiment of the present disclosure. The third flat pack 9 may include the spacer 10, the tube 3a, a protective jacket 11, the TEC 12, and one or more (pair shown) tear cords 7. The jacket 11 of the third flat pack 9 may be similar to the jacket 4 of the first 1 and second 5 flat packs except for having a reduced width to prevent waste of material.

The TEC 12 may be used to operate a downhole sensor (not shown) assembled as part of the production tubing string. The TEC 12 may include an inner electrical conductor 12e, an annular layer of electrically insulating material 12d concentrically arranged about the inner conductor, an annular layer of filler material 12f concentrically arranged about the insulating material, and an outer tube 12t concentrically arranged about the filler material. The inner conductor 12e may be made from an electrically conductive material, such as copper. The copper may be coated with a protective layer, such as tin, nickel, or silver. The inner conductor 12e may be a single wire (shown) or a wire rope (not shown) including a plurality of twisted wires. The insulating material 12d may be a thermoplastic polymer or thermoplastic copolymer, such as polypropylene or fluoropolymer (PVDF, ETFE, FEP, ECTFE, or PTFE). The filler material 12f may be a thermoplastic polymer or thermoplastic copolymer, such as polypropylene or fluoropolymer (FEP or PFA). The outer tube 12t may be made from a metal or alloy, such as stainless steel or nickel-chromium-iron alloy. The outer tube 12t may have an outer diameter ranging between one-eighth inch (three point one seven five millimeters) and one-half inch (thirteen millimeters) and have a wall thickness ranging between one-hundredth inch (one-quarter millimeter) and one-twentieth inch (one point three millimeters).

Alternatively, the TEC 12 may further include an outer electrical conductor, such as foil or braid, made from an electrically conductive material, such as copper or aluminum. The outer conductor may be disposed between the outer tube 12t and the filler material 12f.

The flowline tube 3a may have a larger outer diameter than the outer tube 12t of the TEC 12. The spacer 10 of the third flat pack 9 may be similar to the spacer 6 of the second flat pack 5 except for having different concave sides to accommodate the different diameters of the flowline tube 3a and the outer tube 12t and except for having a pair of guides 8 instead of a single guide. The concave side adjacent the TEC 12 may have upper and lower tapered guide portions and a cylindrical receptacle section receiving a portion of the TEC. A curvature of the cylindrical receptacle section may match a curvature of the outer tube 12t. The portion of the outer tube 12t received by the spacer 10 may range between one-quarter and one-half of the outer surface thereof.

Alternatively, the flowline tube 3a may have an outer diameter equal to the outer diameter of the TEC outer tube 12t. Alternatively, the third flat pack 9 may include a TEF instead of the TEC.

Figure 3B:
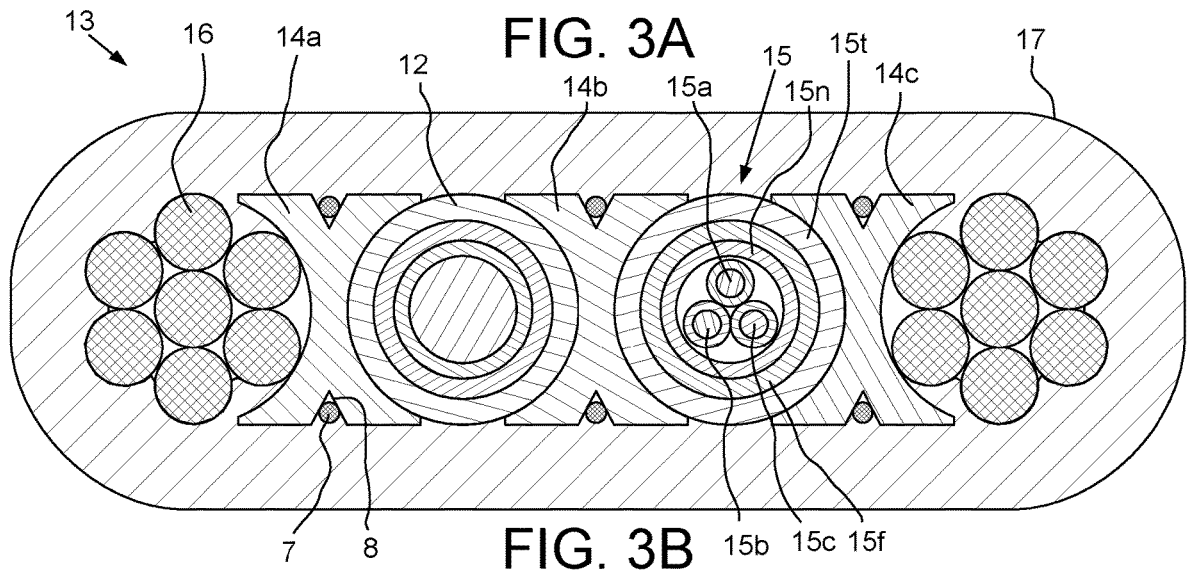
FIG. 3B illustrates a fourth flat pack having tear cord equipped spacers between a TEC and a tubing encased optical cable (TEF) and between a bumper and the respective TEC/TEF, according to another embodiment of the present disclosure.

FIG. 3B illustrates a fourth flat pack 13 having tear cord 7 equipped spacers 14a-c between the TEC 12 and a tubing encased optical cable (TEF) 15 and between a bumper 16 and the respective TEC/TEF, according to another embodiment of the present disclosure. The fourth flat pack 9 may include the spacers 14a-c, a protective jacket 17, the TEC 12, the TEF 15, the bumpers 16, and one or more (pair shown) tear cords 7 for each spacer. The first spacer 14a may be disposed between a first bumper 16 and the TEC 12. The second spacer 14b may be disposed between the TEC 12 and the TEF 15. The third spacer 14c may be disposed between the TEF 15 and a second bumper 16. Each bumper 16 may be a wire rope (not shown) including a plurality of twisted wires made from a metal or alloy, such as steel. The jacket 17 of the fourth flat pack 9 may be similar to the jacket 4 of the first 1 and second 5 flat packs except for having an increased width to accommodate the inclusion of additional members and a reduced height to accommodate the reduced heights/diameters of the members.

The TEF 15 may be used to operate a downhole sensor (not shown) assembled as part of the production tubing string or itself be used as a downhole sensor. The TEF 15 may include an inner set of one or more optical fibers 15a-c, an inner tube 15n arranged about the inner fibers, an annular layer of filler material 15f concentrically arranged about the inner tube 15n, and an outer tube 15t concentrically arranged about the filler material. The inner fibers 15a-c may each include an inner core and outer cladding made from an optically conductive material, such as silica glass. The inner tube 15n may be made from a metal or alloy, such as stainless steel. The filler material 15f may be a thermoplastic polymer or thermoplastic copolymer, such as polypropylene or fluoropolymer (PTFE). The outer tube 15t may be made from a metal or alloy, such as stainless steel or nickel-chromium-iron alloy. The outer tube 15t may have an outer diameter ranging between one-eighth inch (three point one seven five millimeters) and one-quarter inch (six point three five millimeters) and have a wall thickness ranging between one-hundredth inch (one-quarter millimeter) and one-twentieth inch (one point three millimeters).

The diameters of the bumpers 16, TEC 12, and TEF 15 may all be the same. The spacers 14a-c of the fourth flat pack 13 may each be similar to the spacer 6 of the second flat pack 5 except for having reduced height to accommodate the reduced diameters of the members and except for having a pair of guides 8 instead of a single guide.

Alternatively, the fourth flat pack 13 may include a pair of TECs or a pair of TEFs instead of one of each. Alternatively, the diameters of one or more of the members 12, 15, 16 may be different and one or more of the spacers may be asymmetric similar to the spacer 10. Alternatively, any of the other flat packs 1, 5, 9 may have bumpers 16. Alternatively, the fourth flat pack 13 may further include one or more flowlines. Alternatively, each bumper 16 may be a rod, bar, or pipe instead of a wire rope.

Figure 3C:
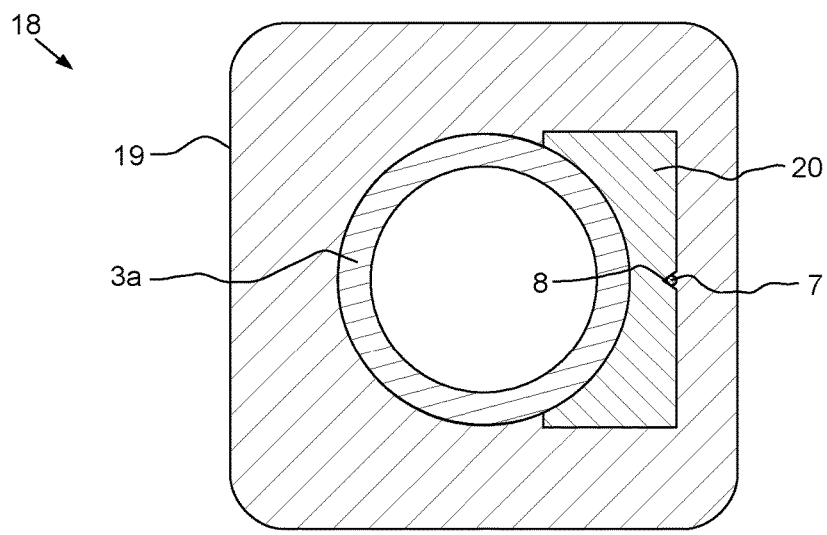
FIG. 3C illustrates a downhole line having a tear cord equipped spacer adjacent a single flowline, according to another embodiment of the present disclosure.

FIG. 3C illustrates a downhole line 18 having a tear cord 7 equipped spacer 20 adjacent a single flowline, according to another embodiment of the present disclosure. The line 18 may include the spacer 20, the tube 3a, a protective jacket 19, and the tear cord 7. The jacket 19 of the line 18 may be similar to the jacket 4 of the first 1 and second 5 flat packs except for having a rounded square shape instead of a rounded rectangular shape. The spacer 20 of the of the line 18 may be similar to the spacer 6 of the second flat pack 5 except for having one concave side and one flat side instead of two concave sides and except for having the guide 8 located in the flat side instead of the bottom thereof. The guide 8 may be located at a center of the flat side.

Alternatively, the tube 3a may be part of the TEC 12 or the TEF 15 instead of serving as the flowline. Alternatively, the downhole line 18 may be a flat pack including a pair of bumpers and a pair of spacers disposed between the tube 3a and the bumpers. The spacers separating the tube 3a from the bumpers may be similar to any of the spacers 2, 6, 10, 14a-c.

While the foregoing is directed to embodiments of the present disclosure, other and further embodiments of the disclosure may be devised without departing from the basic scope thereof, and the scope of the invention is determined by the claims that follow.

The invention claimed is:

1. A flat pack for operating a downhole tool or sensor, comprising:
   a plurality of tubes;
   a spacer disposed between the tubes;
   a tear cord; and
   a jacket encapsulating the tubes, the spacer, and the tear cord wherein:
   the tubes and the spacer are positioned in the jacket in a side-by-side arrangement,
   the tubes and the spacer are not twisted along the flat pack,
   the spacer has a top, a bottom, and concave sides receiving portions of outer surfaces of the tubes, and
   the tear cord is disposed in a guide formed in the top or bottom of the spacer.

2. The flat pack of claim 1, wherein the tubes are each metallic.

3. The flat pack of claim 1, wherein the spacer is made from a thermoset polymer having sufficient flexibility so that the flat pack is spoolable.

4. The flat pack of claim 1, wherein the jacket is made from a thermoplastic polymer, a thermoplastic copolymer, or a thermoplastic elastomer.

5. The flat pack of claim 1, wherein a height of the spacer matches a diameter of at least one of the tubes, and a minimum width of the spacer is at least one millimeter.

6. The flat pack of claim 1, wherein a top of the spacer is flat or slightly curved, a bottom of the spacer is flat or slightly curved, and a curvature of each concave side matches a curvature of the respective tube.

7. The flat pack of claim 6, wherein a diameter of one of the tubes is greater than a diameter of the other tube.

8. The flat pack of claim 6, wherein the concave sides of the spacer are asymmetric.

9. The flat pack of claim 1, wherein a cross-section of the spacer resembles an hourglass shape.

10. The flat pack of claim 1, wherein the tear cord is an upper tear cord.

11. The flat pack of claim 1, wherein the guide is an upper guide formed in the top of the spacer.

12. The flat pack of claim 1, further comprising a lower tear cord disposed in a lower guide formed in the bottom of the spacer.

13. The flat pack of claim 1, wherein one of the tubes is a flowline.

14. The flat pack of claim 1, wherein one of the tubes is part of a tubing encased conductor.

15. The flat pack of claim 1, wherein one of the tubes is part of a tubing encased optical cable.

16. The flat pack of claim 1, further comprising a pair of bumpers, and second and third spacers disposed between a respective tube and a respective bumper, wherein the jacket also encapsulates the bumpers and the second and third spacers.

17. The flat pack of claim 1, wherein the top or bottom of the spacer in which the tear cord is disposed is flat.

18. A flat pack for operating a down hole tool or sensor, comprising:
- a tube;
- a pair of bumpers;
- a pair of spacers disposed between the tube and the bumpers; and
- a jacket encapsulating the tube, the bumpers, and the spacers,
- wherein the tube, the spacers, and the bumpers are positioned in the jacket in a side-by-side arrangement, and
- wherein the tube and the spacers are not twisted along the flat pack.

19. The flat pack of claim 18, wherein the tube is metallic.

20. The flat pack of claim 18, wherein the spacer is made from a thermoset polymer having sufficient flexibility so that the flat pack is spoolable.

21. The flat pack of claim 18, wherein the jacket is made from a thermoplastic polymer, a thermoplastic copolymer, or a thermoplastic elastomer.

22. The flat pack of claim 18, wherein a height of the spacer matches a diameter of the tube, and a minimum width of the spacer is at least one millimeter.

23. The flat pack of claim 18, wherein a top of the spacer is flat or slightly curved, a bottom of the spacer is flat or slightly curved, and a curvature of the concave side matches a curvature of the tube.

24. The flat pack of claim 23, wherein the concave side of the spacer is a first concave side, the spacer has a second concave side, and the first concave side and the second concave side are asymmetric.

25. The flat pack of claim 18, wherein a cross-section of the spacer resembles an hourglass shape.

26. The flat pack of claim 18, wherein the tube is a flowline.

27. The flat pack of claim 18, wherein the tube is part of a tubing encased conductor.

28. The flat pack of claim 18, wherein the tube is part of a tubing encased optical cable.

29. The flat pack of claim 18, further comprising a tear cord,
- wherein the jacket also encapsulates the tear cord,
- wherein the spacer has a top, a bottom, and a concave side receiving a portion of an outer surface of the tube, and
- wherein the tear cord is disposed in a guide formed in the top or bottom of the spacer.

30. The flat pack of claim 29, wherein the top or bottom of the spacer in which the tear cord is disposed is flat.

* * * * *